United States Patent [19]

Turner et al.

[11] Patent Number: 4,792,035

[45] Date of Patent: Dec. 20, 1988

[54] COIL SPRING FEEDING APPARATUS OR MACHINE

[75] Inventors: Herbert E. Turner; Lynn C. Turner, both of Auckland, New Zealand

[73] Assignee: Frank L. Wells Company, Kenosha, Wis.

[21] Appl. No.: 286,698

[22] Filed: Jul. 24, 1981

[51] Int. Cl.$^4$ .............................................. B65G 37/00
[52] U.S. Cl. ................................ 198/463.6; 198/463.4; 414/330; 221/298
[58] Field of Search ................ 198/492, 491; 221/212, 221/298; 414/105, 330; 140/3 CA

[56] References Cited

U.S. PATENT DOCUMENTS

| | | | |
|---|---|---|---|
| 2,771,177 | 11/1956 | Cutter et al. | 198/492 X |
| 3,575,303 | 4/1971 | Fischer et al. | 294/87 X |
| 4,050,610 | 9/1977 | Sturm | 198/491 X |
| 4,120,392 | 10/1978 | Sturm | 198/491 X |

Primary Examiner—Sherman D. Basinger
Assistant Examiner—Paul E. Salmon
Attorney, Agent, or Firm—Michael, Best & Friedrich

[57] ABSTRACT

Disclosed herein is a coil spring feeding machine comprising a stationary magnet mounted on a frame for releaseably holding individual coil springs delivered thereto, a first conveyor on the frame for containing a plurality of serially nested coil springs and for advancing the coil springs along a path toward the magnet, a second conveyor mounted on the frame for movement so as to transport coil springs from the magnet and including a hook engageable with a coil spring releaseably held by the magnet for removing the coil spring from the magnet in response to second conveyor movement, and first and second fingers located on the frame adjacent to the magnet and movable into, and retractable from, the path of coil spring advance so as sequentially, in a cycle, to prevent further advance of the nested coil springs toward the magnet, to separate the leading coil spring from the remainder of the nested coil springs while preventing advance of the leading coil spring toward the magnet, to advance the leading coil spring to the magnet whereby to deliver the leading coil spring into releaseable engagement with the magnet while preventing advance of the remainder of the nested coil springs toward the magnet, and thereafter to permit continued advance of the remainder of the nested coil springs toward the magnet.

17 Claims, 3 Drawing Sheets

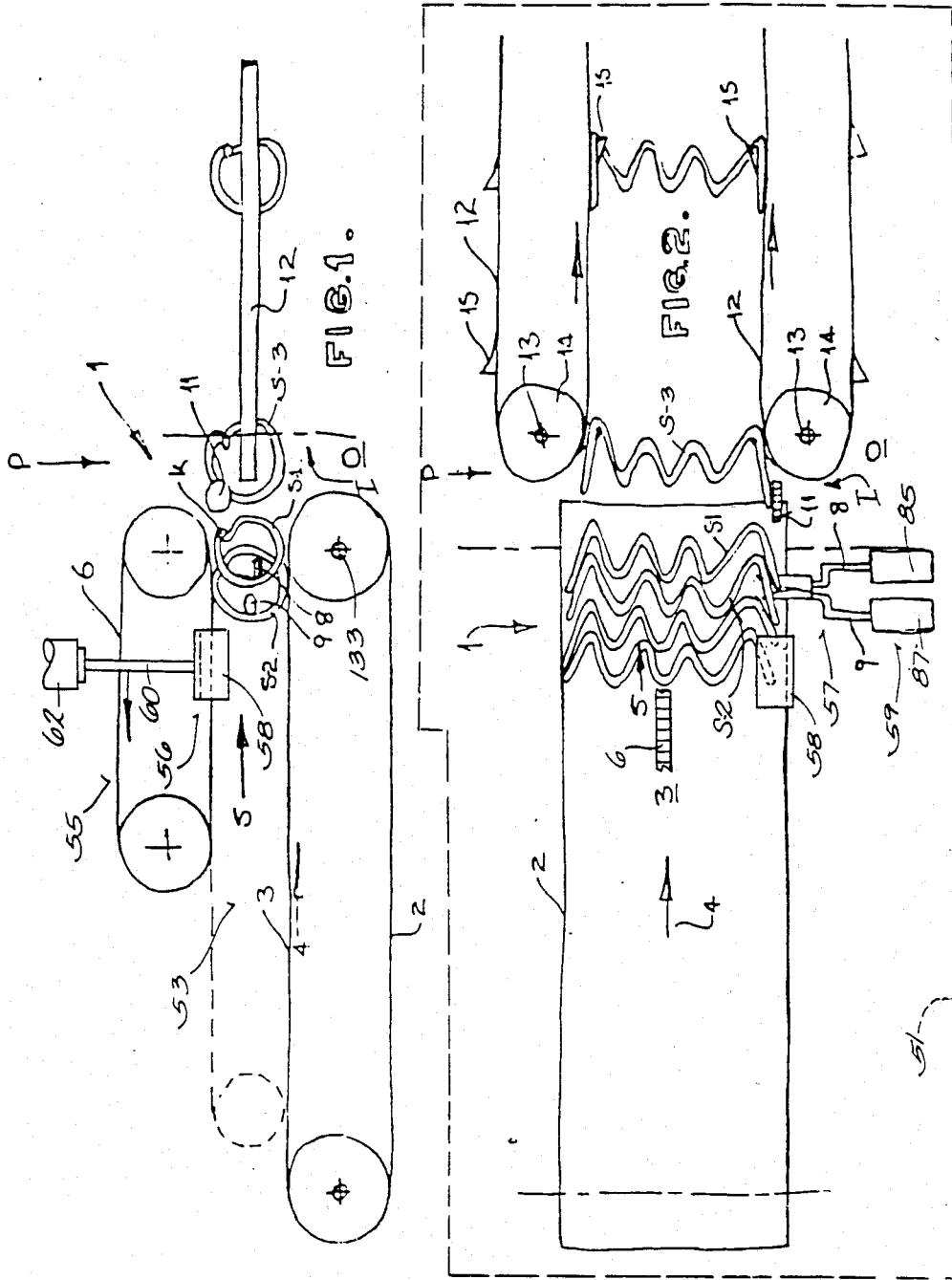

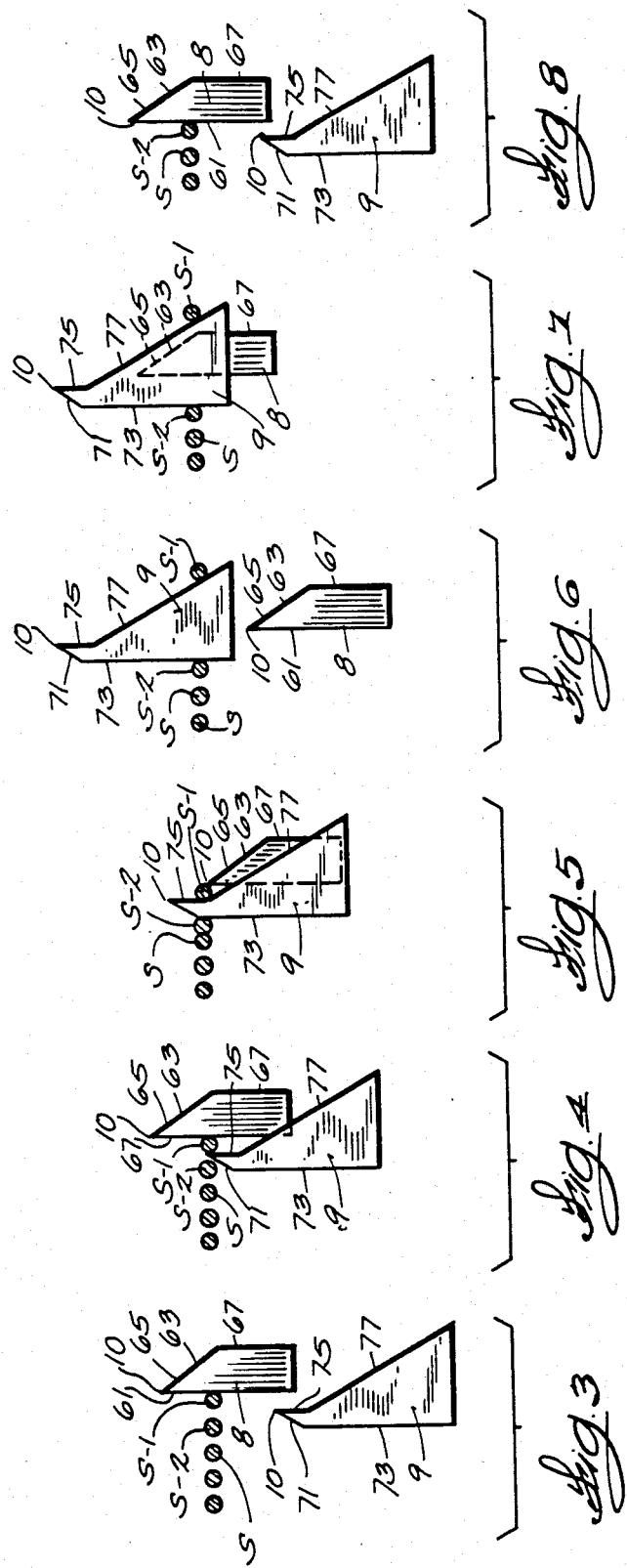

COIL SPRING FEEDING APPARATUS OR MACHINE

BACKGROUND OF THE INVENTION

This invention relates to coil spring feeding apparatus for mattress springs and more particularly to a feeding apparatus adapted to feed coiled springs into a spring base forming apparatus in a substantially controlled and speedy manner.

In the past, spring frame forming devices have been normally either manually fed with springs formed on a separate remote spring making unit or alternatively, have been coupled to a spring making unit which is connected to the spring frame forming apparatus and operates in unison therewith. Substantial problems are found in both forms of apparatus as hereinbefore described, in that in the first instance, a high degree of operator skill is required to achieve even a moderate level of speed in operation by manual placement of springs into a mattress frame forming machine and furthermore, there are substantial dangers involved in manual operation, without the required skill, of a manually fed mattress frame forming unit. In the other form where the spring making unit is coupled directly with the mattress frame forming device, any breakdown of either the spring forming machine or the mattress frame forming device results in a complete shut-down of the apparatus until the malfunction can be repaired.

In the past, it has been traditional for springs to be manufactured separately and stock piled in a way in which they take up relatively small space and are easy to handle and therefore, in the absence of a satisfactory method of automatically feeding springs, manufacturers, except large scale manufacturers, of mattress frames have retained the essentially manual method of feeding springs into the machines, as they retain the ability of continuing to manufacture should either machine break down.

It is therefore an object of this invention to come some way in overcoming the abovementioned problems or at least provide the public with a useful choice.

Attention is directed to the Fischer U.S. Pat. No. 3,575,303 issued Apr. 20, 1971 and particularly to the escapement disclosed therein and shown particularly in FIG. 4 thereof. In addition, attention is directed to the Sturm U.S. Pat. No. 4,050,610 issued Sept. 27, 1977, which patent discloses a movable magnet which is adapted for magnetically attracting and releaseably holding an end coil spring and which is carried by a supporting frame for movement across a conveyor between a retracted position on one side of the conveyor remote from a coil spring magazine and an advanced position located adjacent to the discharge end of the magazine and in position for magnetically attracting and releaseably holding the end coil spring located in the magazine.

SUMMARY OF THE INVENTION

The invention provides a coil spring feeding apparatus or device for mattress frame springs, which device includes a first conveyor adapted for moving springs along a path toward a pickup position, a stop spear and a separator spear mounted between a portion of the conveyor and the pickup position, the stop spear and separator spear being selectively movable into and out of the path, the stop spear and separator spear having tips thereof substantially spaced from one another a predetermined distance, magnetic holding means stationarily positioned in the pickup position, and a second conveyor extending from the pickup position such that the first conveyor moves the springs along the path to against the stop spear located in the path, the separator spear thereafter moving into the path to trap a spring between the spaced tips, whereupon the stop spear withdraws from the path and the previously trapped spring is magnetically attracted to the holding means in the pickup position where the spring is held until drawn therefrom by the second conveyor, the stop spear thereafter again moving into the path and the separator spear withdrawing from the path so as to commence another cycle.

The invention further provides a coil spring feeding apparatus comprising a first conveyor adapted for moving springs along a path toward a pickup position, a stop spear and a separator spear mounted between a portion of the conveyor and the pickup position, the stop spear and separator spear being selectively movable into and out of the path, the stop spear and separator spear having tips thereof substantially spaced from one another a predetermined distance, magnetic holding means stationarily positioned in the pickup position, a second conveyor extending from the pickup position, and influencing means provided in spaced relationship with the first conveyor to provide a passage of a predetermined size between the influencing means and the first conveyor, the arrangement being such that the first conveyor moves the springs along the path into the passage between the influencing means and the first conveyor to initially separate the springs from one another and to bring a spring against the stop spear located in the path, the separator spear thereafter moving into the path to trap a spring between the spaced tips, whereupon the stop spear withdraws from the path and the previously trapped spring is magnetically attracted to the holding means in the pickup position where the spring is held until drawn therefrom by the second conveyor, the stop spear thereafter again moving into the path and the separator spear withdrawing from the path so as to commence another cycle.

The invention further provides a method of separating springs including the steps of moving the springs along a path on a first conveyor toward a pickup position, providing a stop spear and a separator spear mounted between a part of the conveyor and the pickup position, arranging the stop and separator spears for selective movement into and out of the path, arranging the stop spear and separator spear to have tips thereof substantially spaced from one another a predetermined distance, providing magnetic holding means stationarily positioned in the pickup position, providing a second conveyor extending from the pickup position whereby, in use, the first conveyor moves the springs along the path to against the stop spear located in the path, whereafter the separator spear is moved into the path to trap a spring against the stop spear and between the spaced tips, whereupon the stop spear is withdrawn from the path and the previously trapped spring is magnetically attracted to the holding means until the spring is withdrawn by the second conveyor, whereafter the stop spear is again located in the path and the separator spear is withdrawn from the path so as to commence another cycle.

Still further, the invention also provides a method of separating springs including the steps of moving the springs along a path on a first conveyor toward a pickup position and unbunching the springs by placing pressure on a bunch of the springs, providing a stop spear and a separator spear mounted between a part of the first conveyor and the pickup position, arranging the stop and separator spears for selective movement into and out of the path, arranging the stop spear and separator spear to have tips thereof substantially spaced from one another a predetermined distance with the stop spear nearest the pickup position, providing magnetic holding means positioned stationarily in the pickup position, providing a second conveyor extending from the pickup position whereby, in use, the first conveyor moves the springs along the path to against the stop spear located in the path, whereafter the separator spear is moved into the path to trap a spring against the stop spear and between the spaced tips, whereupon the stop spear is withdrawn from the path and the previously trapped spring is magnetically attracted to the holding means until the spring is withdrawn by the second conveyor, whereafter the stop spear is again located in the path and the separator spear is withdrawn from the path so as to commence another cycle.

The invention further provides a coil spring feeding machine comprising stationary means on a frame for releaseably holding individual coil springs delivered thereto, means on the frame for containing a plurality of serially nested coil springs and for advancing the coil springs along a path toward the coil spring holding means, conveyor means mounted on the frame for movement so as to transport coil springs from the holding means and including picker means engageable with a coil spring releaseably held by the holding means for removing the coil spring from the holding means in response to conveyor movement, and means located on the frame adjacent to the holding means and movable relative to the path of coil spring advance so as to deliver the leading coil spring into releaseable engagement with the holding means, while preventing advancement of the remainder of the nested coil springs towards the holding means.

The invention also provides a coil spring feeding machine comprising means on a frame for containing a plurality of serially nested coil springs and for advancing the coil springs along a path toward a discharge end, and finger means located on the frame adjacent to the discharge end and movable into, and retractable from, the path of coil spring advance so as sequentially, in a cycle, to prevent further advancement of the nested coil springs toward the discharge end, to separate the leading coil spring from the remainder of the nested coil springs and to advance the leading coil spring to the discharge end while preventing advance of the remainder of the nested coil springs toward the discharge end, and to thereafter permit continued advancement of the remainder of the nested coil springs toward the discharge end.

The invention also provides a coil spring feeding machine comprising stationary means on the frame for releaseably holding individual coil springs delivered thereto, means on the frame for containing a plurality of serially nested coil springs and for advancing the coil springs along a path toward the coil spring holding means, conveyor means mounted on the frame for movement so as to transport coil springs from the holding means and including picker means engageable with a coil spring releaseably held by the holding means for removing the coil spring from the holding means in response to conveyor movement, and finger means located on the frame adjacent to the holding means and movable into, and retractable from, the path of coil spring advance so as sequentially, in a cycle, to prevent further advance of the nested coil springs toward the holding means, to separate the leading coil spring from the remainder of the nested coil springs and to advance the leading coil spring to the holding means, whereby to deliver the leading coil spring into releaseable engagement with the holding means, while preventing advance of the remainder of the nested coil springs toward the holding means, and to thereafter permit continued advancement of the remainder of the nested coil springs toward the holding means.

Other aspects of this invention which should be considered in all its novel aspects will become apparent from the following description. Modifications are envisaged and may be incorporated without departing from the scope and spirit thereof.

One form of the invention will now be described with reference to the accompanying drawings:

FIG. 1 is a substantially diagrammatic plan view of a coil spring feeding machine embodying various of the features of the invention.

FIGS. 3 through 8 are successive views schematically illustrating the operational cycle of the finger means incorporated in the machine shown in FIG. 1.

FIG. 9 is a schematic view of the drive train embodied in the apparatus shown in FIGS. 1 and 2.

GENERAL DESCRIPTION

Figure 2:
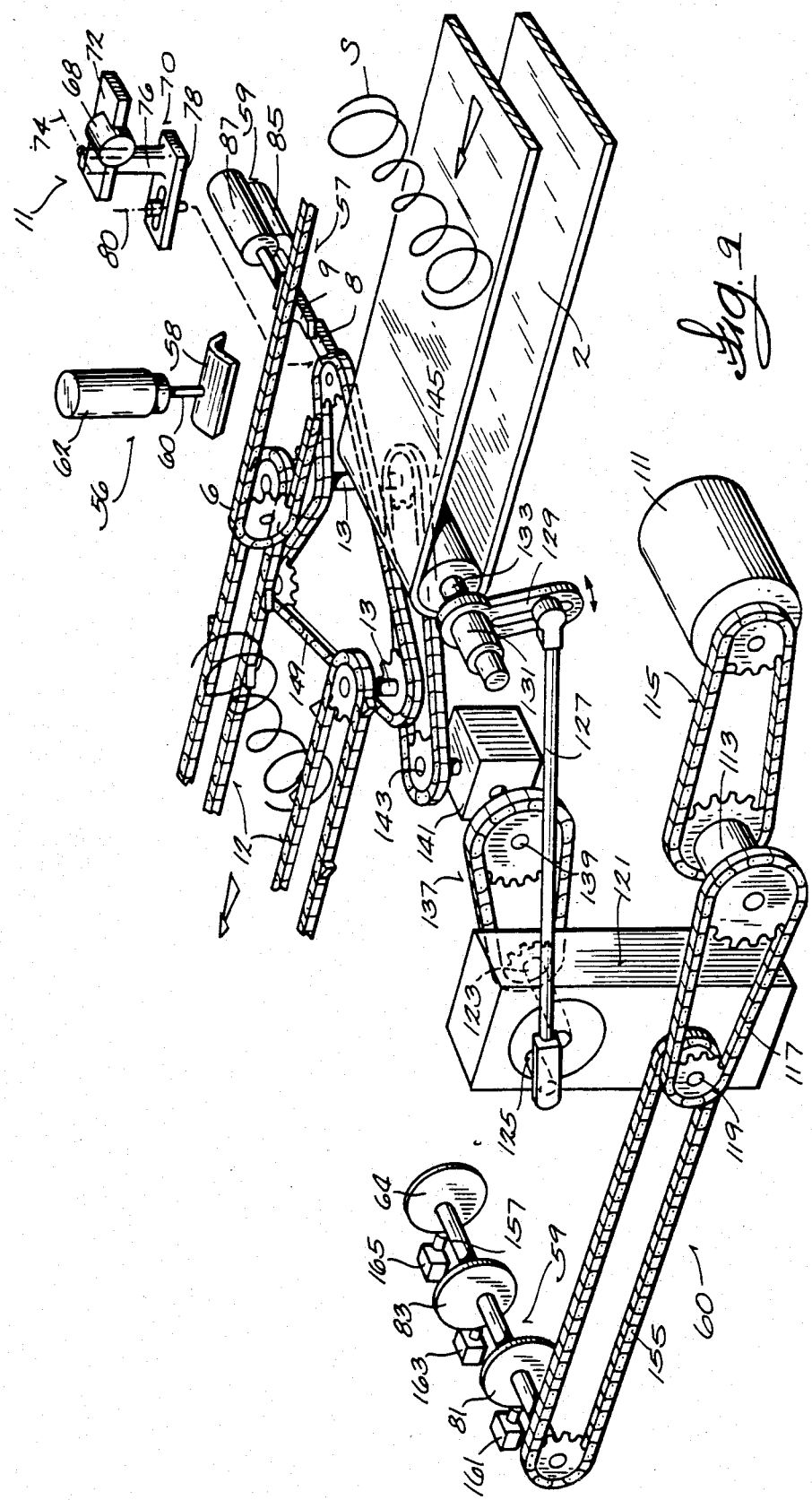
FIG. 2 is a substantially diagrammatic side elevational view of the machine shown in FIG. 1.

With reference to the drawings, the apparatus of this invention is preferably constructed in any material having the necessary inherent properties of durability and strength. Preferably, the apparatus is fabricated in mild steel. However, in alternative forms of the invention, it is envisaged that castings in aluminum, and in some cases plastic and the like, could also be utilized.

It will be appreciated that the apparatus as hereinafter described is substantially continuous in operation and requires merely occasional feeding with springs. Preferably, the apparatus described hereinafter is pneumatically operated via a programming wheel or wheels, with valves and micro switches coupled into an actuating circuit. However, in alternative forms of the invention, it is envisaged that either electrical, mechanical or electro-mechanical apparatus could be incorporated to facilitate the moving operations required.

Particularly with reference to FIG. 1, the apparatus is generally indicated by the numeral 1 and includes a frame 51, together with means 11 stationarily supported on the frame 51 for releasably holding individual coil springs delivered thereto, and means 53 on the frame for containing a plurality of serially nested coil springs S and for advancing the coil springs S along a path or passageway 5 toward the coil spring holding means 11. While various other arrangements can be employed, in the illustrated construction, such means 53 comprises a first conveyor 2 which is preferably arranged to provide an upper surface 3 for supporting thereon a row of substantially concertina stacked springs S lying on their sides with the top and bottom tapers of faces of the springs forwardly of one another in order that a frontmost or endmost or leading spring S-1 can be withdrawn from the next adjacent spring S-2. The first conveyor 2 rotates in the direction of arrow 4 and provides the path or pathway 5 atop the surface 3 for supporting the springs S thereon. The conveyor can comprise two spaced chains which move over the surface 3.

Preferably side portions (not shown) are provided along the sides of the spring passageway 5 so as to hold the springs in position thereon.

An auxiliary influencing means 55 which, in the form of the invention shown in FIG. 1, comprises an auxiliary conveyor 6 which is preferably mounted above the spring path or passageway 5 in an adjustable position in relation to the first conveyor 2 to rotate in a substantially opposite direction to the first conveyor 2. The conveyor 6 is drivingly connected to the conveyor 2 so as to move in unison. When springs are moved through the passage between the first conveyor 2 and the auxiliary conveyor 6, the springs S are slightly compressed or pressured by said passage being formed of a height substantially commensurate with or slightly less than the diameter of the springs S. The slight compression of the springs tends to effect rough spacing or debunching of the springs from one another as they pass through the passage along the spring path or passageway 5.

Preferably the auxiliary conveyor 6 is in the form of a single chain and is provided adjacent an output or discharge end 0 of the first conveyor 2 and is adapted to rotate slightly slower than the first conveyor 2 so that upon springs being held between the first conveyor 2 and the auxiliary conveyor 6, the springs tend to rotate to position a knob K thereon upwardly, (against the natural bias of the spring for the knot to fall toward the first conveyor 2 owing to the effects of gravity).

Additional means 56 can be provided for debunching the springs S. While various arrangements can be employed, in the illustrated construction, such means 56 comprises a downwardly open inverted V-shaped debunching member 58 which is mounted on the end of an upwardly biased piston 60 of an air valve 62 and which is located so as to periodically exert downward pressure on the upper portion of the end coils along one edge of the nested coil spring S and thereby to cause separation or debunching of the coil springs S in the direction of the length of the first conveyor 2. The air valve 62 is actuated by a cam 64 (see FIG. 9) as will hereinafter be described.

The apparatus 1 also includes means 57 located on the frame 51 adjacent to the holding means 11 and movable relative to the path of coil spring advance so as to deliver the leading or endmost coil spring S-1 into releaseable engagement with the holding means 11, while preventing advancement of the remainder of the nested coil springs S toward the holding means. More particularly, such means preferably comprises finger means operable sequentially in a cycle to prevent further advancement of the nested coil springs toward the holding means 11, to separate the leading coil spring S-1 from the remainder of the nested coil springs S while preventing advance of the leading coil spring S-1 toward the holding means 11, to advance the leading coil spring S-1 to the holding means 11, whereby to deliver the leading coil spring S-1 into releasable engagement with the holding means 11, while at the same time preventing advancement of the remainder of the nested coil springs S toward the holding means 11, and thereafter to permit continued advance of the remainder of the nested coil springs S toward the holding means 11.

As shown in FIG. 2, a stop spear 8 and separating spear 9 are provided substantially adjacent the output end 0 of the first conveyor 2. Preferably, the stop spear 8 and separating spear 9 are positioned to one side of the spring pathway 5 and include tips 10 preferably extending into the spring path or passageway 5 when in an activated position. Preferably, the stop spear 8 and separating spear 9 have their tips 10 substantially spaced from one another, as shown diagrammatically in FIGS. 1 through 8, at least the distance of the thickness of the wire forming one spring member. When retracted, the tips 10 of the stop spear 8 and separating spear 9 are removed from the spring path or passageway 5. However, such retractions and actuations of the spears 8 and 9 are according to strict synchronization with one another.

The output end 0 of the first conveyor 2 substantially corresponds with a pickup position P substantially shown diagrammatically by arrows P of FIG. 1 and FIG. 2. The pickup position P is located immediately downstream from the stop spear 8 which is located downstream relative to the separating spear 9 and below the separator spear 9.

More particularly, in this last regard, and as shown in greater detail in FIGS. 3 through 8, the stop spear or finger 8 includes a blocking side edge 61 which extends laterally outwardly from the tip 10 in perpendicular relation to the path of advance of the coil springs, together with a forward edge 63 which includes an inner inclined portion 65 extending laterally outwardly and forwardly from the tip 10 and an outer portion 67 extending in parallel relation to the blocking edge 61.

The separating finger or spear 9 includes a separating edge 71 which extends from the tip 10 in laterally outwardly and rearwardly inclined relation so that engagement of the next to the leading coil spring S-2 by the separating edge 71 will displace the next to the endmost or leading coil spring S-2 in the direction opposite to the advancement of the coil springs S toward the holding means 11 in response to insertion of the separating spear or finger 9 into the path 5 of coil spring advance as indicated in FIGS. 4 and 5. The separating spear or finger 9 also includes a stop edge 73 which extends from the outer end of the separating edge 71 in parallel relation to the blocking edge 61 on the stop spear or finger 8.

The separating spear or finger 9 also includes a straight edge 75 which extends laterally outwardly from the tip 10 for a relatively short distance and in parallel relation to the blocking edge 61 on the stop spear or finger 8, together with a forward camming edge 77 which extends from the outer end of the straight edge 75 in laterally outwardly and forwardly inclined relation toward the holding means 11 and for a distance in the direction of coil spring advance beyond the forward edge 63 of the stop spear or finger 8 so that lateral inward movement of the separating spear or finger 9 also serves to advance the endmost or leading coil spring S-1 beyond the path of movement of the stop spear or finger 8 and to the position of engagement with the holding means 11.

Suitable means 59 (see FIG. 9) are provided for sequentially operating the stop and separating spears or fingers 8 and 9 for coordinated insertion and withdrawal from the path 5 of coil spring advancement toward the holding means 11. More specifically, while other arrangements could be employed, in the construction shown in FIG. 9, such means comprises rotating cams 81 and 83 which are respectively associated with air valves 85 and 87 (see FIG. 2) controlling movement of the spears or fingers 8 and 9 between spaced positions which are fully inserted relative to the path 5 of coil spring advance and fully withdrawn relative to the path 5 of coil spring advance. Preferably, the stop spear or finger is normally biased inwardly to the advanced position in the spring bath 5, as shown in FIGS. 3 and 8, and the separating spear or finger 9 is normally retracted out of the spring bath 5, as shown in FIGS. 3 and 8, and the the valves 85 and 87 are actuated to cause stop spear or finger movement to the retracted position and separator spear or finger movement to the advanced positions.

Thus, at the starting or rest condition of the fingers 8 and 9, as shown in FIGS. 3 and 8, the cams 81 and 83 are related to each other such that the stop spear or finger 8 is fully inserted and the separating spear or finger 9 is fully withdrawn. As the cams 81 and 83 rotate, the separating spear or finger 9 is moved from the fully withdrawn position to the fully inserted position (see FIG. 6). While such movement occurs quite rapidly, nonetheless a certain time interval occurs during such separating finger movement from the fully withdrawn to the fully inserted position.

During this time interval, the inward movement of the separating spear or finger 9 causes (see FIG. 5) rearward displacement of the next to the last coil spring S-2. Also during this interval, the stop spear or finger cam 81 operates to cause retraction of the stop spear or finger 81 from the fully inserted position shown in FIGS. 3 and 4 to the fully withdrawn position shown in FIG. 6.

In particular, the cams 81 and 83 are designed so the inward movement of the separating spear or finger 9 and outward movement of the stop spear or finger 8 are coordinated such that the stop spear or finger 8 moves (see FIG. 5) out of the path 5 of advance of the leading or endmost coil spring S-1 just prior to engagement of the endmost or leading coil spring S-1 by the forward camming edge 77 as the separating spear or finger 9 moves inwardly. Thus, withdrawal of the stop spear or finger 8 permits operation of the separating spear or finger 9, by means of engagement by the forward camming edge 77 with the endmost or leading coil spring S-1 and by means of insertion of the separating spear or finger 9 to the position shown in FIG. 6, to advance or displace the endmost or leading coil spring S-1 into a position of engagement by the holding means 11.

Movement of the separating finger or spring 9 to the fully inserted position also causes engagement by the stop edge 73 with the next coil spring S-2 to prevent advancement of the remainder of the nested coil springs S.

After the separating spear or finger 9 is fully inserted and the leading coil spring S-1 is advanced beyond the forward edge 63 of the stop spear or finger 8 as shown in FIG. 6, the cam 81 operates to again cause stop finger movement to the fully inserted position as shown in FIG. 7. Thereafter, the cam 83 operates to withdraw the separating spear or finger 9 to its fully withdrawn position as shown in FIG. 8, thereby permitting further advancement of the nested coil springs S until engagement by the blocking edge 61 of the fully inserted stop spear or finger 8 as shown in FIG. 8.

The pickup position P incorporates the holding means 11 which, in the illustrated apparatus 1, is a substantially magnetic member 68 stationarily fixed on an adjustable mount 70 movable relative to the frame 51 of the apparatus 1 so that the magnetic holding means 11 is positioned substantially adjacent the separating spear 9 and stop spear 8 and in such a position that the magnetic holding means 11 may readily attract and attach a spring once the spring has passed the stop spear 8.

Preferably, the magnetic holding means 11 is substantially adjustable in height and distance away from the spring path or passageway 5 laterally, so that an angle of the spring when held thereon can be adjusted to suit conditions of use. In a preferred from of the invention, the magnetic holdings means 11 preferably attaches the separated spring S-3 and holds such spring substantially adjacent the knot K and is adjusted so as to enable such a holding position to provide a steady reference point for springs passing through the feeding apparatus 1.

More particularly, while the holding means 11 is essentially a stationarily mounted magnet 68, the mount or support 70 for the magnet 68 is adjustable. In this regard, the magnet 68 comprises a short cylinder about 13/16" in diameter and is fixed (as shown in FIG. 9) on an arm 72 carried for selective angular adjustment about a horizontal axis 74 by a nut and bolt passing through the upright leg 76 of a bracket 78 which, in turn, is connected by a nut and bolt to the machine frame 51 for selective adjustment lengthwise of the frame 51 and for selective angular adjustment about the axis 80 of the bolt. Thus the magnet 68 can be adjustably positioned for location in a position of maximum effectiveness. It is preferred that the magnet 68 be located such that one end coil of the separated coil spring S-3 is located as shown in FIG. 1 in relation to the magnet 68 in response to advance thereof by the forward camming edge 77 of the separating finger 9.

Immediately downstream of the holding means 11 and associated therewith is a second conveyor 12. The second conveyor 12 is preferably provided as a bifurcated conveyor including opposed first and second runs with the drive shafts 13 of the rollers 14 supporting the conveyor runs mounted substantially vertically, or orthogonally relative to the first conveyor 2. The second conveyor 12 preferably provides a pair of pulleys or rollers 14 positioned immediately adjacent the output or discharge end 0 of the first conveyor 2 and in such a position that an input end I thereof passes in close proximity with the holding means 11. Preferably, the runs of the conveyor 12 each include a conveyor chain having thereon picker means in the form of hooking lugs 15 adapted to engage with end portions of the spring held by the holdings means 11 and thereafter, to slightly compress the spring and to carry the spring toward an end use, for example, in a mattress frame forming device. If desired, the hooking lugs 15 can be carried only by one of the runs.

It is to be appreciated that the second conveyor 12 can be coupled into the mattress frame forming apparatus to synchronize therewith and therefore the timing circuit for the remainder of the apparatus described hereinbefore of the feeding apparatus can be timed to operate from actuation of the second conveyor 12 so as to ensure that the feeding apparatus operates in sympathy with the apparatus it is feeding. More specifically, means in the form of a drive train 60 (see FIG. 9) is provided for driving the second conveyor 12 in synchronism with the finger means 57. The conveyor drive means 60 can be synchronized with the finger means operational cycle such that the hooking lugs 15 engage the separated coil spring S-3 and remove the separated coil spring S-3 from the magnetic holding means 11 during the interval after full insertion of the separating spear or finger 9, as shown in FIG. 6, and prior to commencement of advancement of the next leading coil spring S-2 by the separating spear or finger forward camming edge 77, as shown in FIG. 5.

More particularly, the drive train 60 is shown schematically in FIG. 9 and includes a motor 111 which is connected to a clutch 113 through a sprocket chain drive 115. In turn, the clutch 113 is connected through a sprocket chain drive 117 to the input shaft 119 of a cyclo indexer 121 which also includes an output shaft 123.

The cyclo indexer 121 operates to rotate the output shaft 123 through 360° in response to 180° of rotation of the input shaft 119. During the next 180° of rotation of the input shaft 119, the output shaft 123 is at rest or at dwell.

One end of the output shaft 123 is connected to an eccentric pin 125 which, in turn, is connected through a drive link 127 with a crank 129 extending from a one-way clutch 131 which is also connected to a shaft 133 which drives the first conveyor 2. Accordingly, the first conveyor 2 advances intermittently, i.e., during one-half of the full rotational cycle of the output shaft 123, thereby urging the coil springs S toward the discharge end 0 of the first conveyor 2. Any suitable drive connection or mechanism (not shown) can be employed to drivingly connect the auxiliary conveyor 6 with the first conveyor 2.

Connected to the other end of the output shaft 123 is a sprocket chain drive 137 which is connected to the input shaft 139 of a right angle gear box 141. In turn, the output shaft 143 of the gearbox is connected to a sprocket chain drive 145 which rotates one of the shafts 13 which drives one of the runs of the second conveyor 12. In addition, said one drive shaft 13 is connected by a second sprocket chain drive 149 to the other drive shaft 13 which drives the other run of the second conveyor 12 at the same speed as the first run. Accordingly, the second conveyor 12 is intermittently advanced during rotation of the output shaft 123.

Also connected to the input shaft 119 is a sprocket chain drive 155 which, in turn, is connected to a camshaft 157 so as to drive the cam shaft 157 at the same rate of rotation as the input shaft 119. Carried on the camshaft 157 are the stop spear cam 81 and the separating spear cam 83 and the debunching member cam 64. The cams 81, 83, and 64 respectively cooperate with electrical switches 161, 163 and 165 which control operation of the stop spear valve 85, the separating spear valve 87, and the debunching member valve 62. The cams 81, 83, and 64 are designed to operate the spears or fingers 8 and 9 and the debunching member 58 at the times indicated herein.

More particularly, it is noted that the drive train 60 is arranged such that the first conveyor 2 advances during the first half of each rotational cycle of the output shaft 123 and such that the stop and separator spear valves 85 and 87 are caused to move the spears or fingers 8 and 9 from their normally biased positions as shown in FIGS. 3 and 8 during the period in which the output shaft 123 is at rest. During the period of rotation of the output shaft 123, the spears or fingers 8 and 9 are located at rest in their normally biased position, i.e., the stop spear or finger 8 is in the advanced position and the separating spear or finger 9 is in the retracted position, both as shown in FIGS. 3 and 8. Furthermore, the hooking lugs 15 and preferably arranged on the conveyor so as to engage and remove the separated coil spring S-3 from the holding means 11 shortly after initiation of each advancing movement of the conveyor 12. If desired, the drive train 60 can be arranged, as already indicated, so as to drive the conveyor 12 to remove the separated coil spring S-3 from the holding means 11 prior to reinsertion into the path of coil spring advance of the stop spear or finger 8.

It is also noted that the debunching valve 62 is actuated by the cam 64 to cause downward coil spring debunching movement of the debunching member 58 during the period when the output shaft 123 is at rest.

In use, the apparatus 1 is preferably fed with springs arranged in concertina fashion, substantially as shown in FIG. 2, the springs being provided in premanufactured bunches and placed upon the conveyor 2 to be moved against the stop spear 8 by the conveyor 2 and rotated into the desired position with the knot K upwardly at the output or discharge end 0 of the conveyor 2. It will be appreciated that while the conveyor 2 is intermittently advanced, it nevertheless operates in a substantially continuous manner and this results in a substantially skidding action in relation to the coil springs and conveyor 2 and therefore, the conveyor 2 and the auxiliary conveyor 6 are preferable formed in a substantially chain or plate-like manner rather than in a rubber or like sticky material.

Preferably the stop spear 8 is normally extended into the spring path or passageway 5 as is shown in FIGS. 2, 3, 4 and 8. The separating spear 9 is normally in a retracted position, substantially as shown in FIGS. 3 an 8, and substantially oppositely as shown in FIG. 2. During operation, the stop spear 8 remains in place until such time as the separating spear 9 actuates and extends into the spring path or passageway 5, engaging its tip 10 between the rear of the first spring S-1 situated against the stop finger 8 and the next adjacent spring S-2, so as to separate the first or leading spring S-1 from the next spring S-2. Thereafter, retraction of the stop spear 8 and continued insertion of the separating spear or finger 9 advances the endmost or separated coil spring S-3 and enables the magnetic holding means 11 to attract and hold thereon the separated spring S-3. Either the stop spear or finger 8, or the separating spear or finger 9, acts as a stop to prevent further spring movement onto the magnetic holdings means 11 and until such time as the separated spring S-3 has been cleared from the pickup point P by the conveyor 12.

Because the stop and separator spears 8 and 9 of the apparatus 1 operate adjacent a back edge of the spring, that is, an edge of the spring inwardly of the bunch rather than the first portion of the spring bunch as it is moved on the conveyor 2, the apparatus 1 provides for a more regular spacing of springs by the stop spear 8 and separator spear 9. It has been found that springs are more regular in shape adjacent the portion opposite the knot and this enables, upon actuation of the apparatus, more equal spacing of the springs by the stop spear 8 and separator spear 9 in use.

Thus by this invention there is provided an apparatus and method for feeding springs in a controlled manner and at a controlled rate.

Various features of the invention are set forth in the following claims.

We claim:

1. A coil spring feeding device for mattress frame springs, said device including a first conveyor adapted for moving springs along a path toward a pickup position, a stop spear and a separator spear mounted, with respect to the path of coil spring movement, upstream of said pickup position, said stop spear and separator spear being selectively moveable into and out of said path, said stop spear and separator spear having tips thereof substantially spaced from one another a predetermined distance, magnetic holding means located stationarily in said pickup position for releasable one-at-a-time holding of the coil springs, and a second conveyor including picker means for engaging the opposite ends of a coil spring releasably held by said holding means and for stripping the coil spring from the holding means, said second conveyor extending from said pickup position such that said first conveyor moves the springs along said path to against said stop spear located in said path, said separator spear thereafter moving into said path to trap a spring between said spaced tips, whereupon said stop spear withdraws from the path and the previously trapped spring is magnetically attracted to said holding means in the pickup position where the spring is releasably held until stripped therefrom by said picker means of said second conveyor, said stop spear thereafter again moving into said path and said separator spear withdrawing from said path so as to commence another cycle.

2. A coil spring feeding apparatus comprising a first conveyor adapted for moving springs along a path toward a pickup position, a stop spear and a separator spear mounted, with respect to the path of coil spring movement, upstream of said pickup position, said stop spear and separator spear being selectively movable into and out of said path, said stop spear and separator spear having tips thereof substantially spaced from one another a predetermined distance, magnetic holding means stationarily positioned in said pickup position for releaseable one-at-a time holding of the coil springs, a second conveyor including picker means for engaging the opposite ends of a coil spring releasably held by said holding means and for stripping the coil spring from the holding means, said second conveyor extending from said pickup position, and an influencing means provided in spaced relationship with said first conveyor to provide a passage of a predetermined size between said influencing means and said first conveyor, the arrangement being such that said first conveyor moves the springs along said path into said passage between said influencing means and said first conveyor to initially separate the springs from one another and to bring a spring against said stop spear located in said path, said separator spear thereafter moving into said path to trap a spring between said spaced tips, whereupon the stop spear withdraws from said path and the previously trapped spring is magnetically attracted to said holding means in said pickup position where the spring is releasably held until stripped therefrom by said picker means of said second conveyor, said stop spear thereafter again moving into said path and said separator spear withdrawing from said path so as to commence another cycle.

3. A method of separating springs including the steps of moving the springs along a path on a first conveyor toward a pickup position, providing a stop spear and a separator spear mounted, with respect to the path of coil spring movement, upstream of the pickup position, arranging the stop and separator spears for selective movement into and out of the path, arranging the stop spear and separator spear to have tips thereof substantially spaced from one another a predetermined distance, providing magnetic holding means stationarily positioned in the pickup position for releasable one-at-a-time holding of the coil springs, providing a second conveyor including picker means for engaging the opposite ends of a coil spring releasably held by the holding means and for stripping the coil spring from the holding means, the second conveyor extending from the pickup position whereby, in use, the first conveyor moves the springs along the path to against the stop spear located in the path, whereafter the separator spear is moved into the path to trap a spring against the stop spear and between the spaced tips, whereupon the stop spear is withdrawn from the path and the previously trapped spring is attracted by and releasably held by the holding means until stripped from the holding means by the picker means of the second conveyor, whereafter the stop spear is again located in the path and the separator spear is withdrawn from the path so as to commence another cycle.

4. A method of separating springs including the steps of moving the springs along a path on a first conveyor toward a pickup position and unbunching the springs by placing pressure on a bunch of the springs, providing a stop spear and a separator spear mounted, with respect to the path of coil spring movement, upstream of the pickup position, arranging the stop and separator spears for selective movement into and out of the path, arranging the stop spear and separator spear to having tips thereof substantially spaced from one another a predetermined distance with the stop spear nearest the pickup position, providing magnetic holding means positioned stationarily in the pickup position for releasable one-at-a-time holding of the coil springs, providing a second conveyor including picker means for engaging the opposite ends of a coil spring releasably held by the holding means and for stripping the coil spring from the holding means, the second conveyor extending from the pickup position whereby, in use, the first conveyor moves the springs along the path to against the stop spear located in the path, whereafter the separator spear is moved into the path to trap a spring against the stop spear and between the spaced tips, whereupon the stop spear is withdrawn from the path and the spring is magnetically attracted to, and releasably held by, the holding means until the spring is stripped from the holding means by the picker means of the second conveyor, whereafter the stop spear is again located in the path and the separator spear is withdrawn from the path so as to commence another cycle.

5. A coil spring feeding machine comprising a frame, stationary means on said frame for releaseably holding individual coil springs delivered thereto, means on said frame for containing a plurality of serially nested coil springs and for advancing the coil springs along a path toward said coil spring holding means, means located on said frame, with respect to the path of coil spring advance, adjacently upstream from said holding means and movable relative to the path of coil spring advance for advancing the leading coil spring into releaseable engagement with said holding means, while preventing advancement of the remainder of the nested coil springs toward said holding means, and conveyor means mounted on said frame for movement so as to transport coil springs from said holding means and including picker means engageable with the opposed ends of a coil spring releaseably held by said holding means for stripping the coil spring from said holding means in response to conveyor movement.

6. A coil spring feeding machine in accordance with claim 5 wherein said means for delivering the leading coil spring while preventing advancement of the remainder of the nested coil springs includes a stop finger and a separator finger.

7. A coil spring feeding machine in accordance with claim 6 wherein at least one of said stop finger and said separator finger operates to prevent advance toward said holding means of the nested coil springs until after removal from said holding means by said picker means of the previously leading coil spring.

8. A coil spring feeding machine in accordance with claim 6 wherein said stop finger is movable between an advanced position in the path of coil spring advance and a retracted position clear of the path of coil spring advance and is normally located in the advanced position, wherein said separator finger is movable between an advanced position in the path of coil spring advance and a retracted position clear of the path of coil spring advance and is normally located in the retracted position, and further including means for sequentially displacing said separator finger to said advanced position, displacing said stop finger to said retracted position, displacing said stop finger to said advanced position, and displacing said separator finger to said retracted position.

9. A coil spring feeding machine comprising a frame, means on said frame for containing a plurality of serially nested coil springs and for advancing the coil springs along a path toward a discharge end, and finger means located on said frame adjacent to said discharge end and including a stop finger and a separator finger located adjacent said stop finger but further from said discharge end than said stop finger and having a camming edge extending in inclined relation to the path of coil spring advance and toward said discharged end, and means for moving said stop finger and said separator finger into and from the path of coil spring advance so as, sequentially, in a cycle, and when said stop finger is located in the path of coil spring advance to thereby prevent further advance of the nested coil springs toward said discharge end, to partially move said separator finger into the path of coil spring advance before moving said stop finger from the path of coil spring advance so as thereby to separate the leading coil spring from the remainder of the nested coil springs and to prevent advancement of the remainder of the nested coil springs beyond said separator finger and toward said discharge end, to move said stop finger from the path of coil spring advance and thereafter to continue movement of said separator finger into the path of coil spring advance and to engage said camming edge with the leading coil spring so as thereby to advance the leading coil spring toward said discharge end and beyond said stop finger, while preventing advance of the remainder of the nested coil springs toward said discharge end, to thereafter move said stop finger into the path of coil spring advance, and to thereafter move said separator finger from the path of coil spring advance to as thereby to permit continued advance of the remainder of the nested coil springs toward said discharge end and engagement of the next leading coil spring with said stop finger.

10. A coil spring feeding machine comprising a frame, stationary means on said frame for releaseably holding individual coil springs delivered thereto, means on said frame for containing a plurality of serially nested coil springs and for advancing the coil springs along a path toward said coil spring holding means, finger means located on said frame, with respect to the path of coil spring advance, adjacently upstream from said holding means and including a stop finger and a separator finger located adjacent said stop finger but further from said holding means than said stop finger and having a camming edge extending in inclined relation to the path of coil spring advance and toward said holding means, and means for moving said stop finger and said separator finger into and from the path of coil spring advance so as, sequentially, in a cycle, and when said stop finger is located in the path of coil spring advance to thereby prevent further advance of the nested coil springs toward said holding means, to partially move said separator finger into the path of coil spring advance before moving said stop finger from the path of coil spring advance so as thereby to separate the leading coil spring from the remainder of the nested coil springs and to prevent advancement of the remainder of the nested coil springs beyond said separator finger and toward said holding means, to move said stop finger from the path of coil spring advance and thereafter to continue movement of said separator finger into the path of coil spring advance and to engage said camming edge with the leading coil spring so as to advance the leading coil spring beyond said stop finger, and to said holding means, whereby to deliver the leading coil spring into releaseable engagement with said holding means while preventing advance of the remainder of the nested coil springs toward said holding means, to thereafter move said stop finger into the path of coil spring advance, and to thereafter move said separator finger from the path of coil spring advance so as thereby to permit continued advance of the remainder of the nested coil springs toward said holding means and engagement of the next leading coil spring with said stop finger, and conveyor means mounted on said frame for movement so as to transport coil springs from said holding means and including picker means engageable with the opposed ends of a coil spring releaseably held by said holding means for stripping the coil spring from said holding means in response to conveyor movement.

11. A coil spring feeding machine in accordance with any of claims 9 or 10 wherein at least one of said stop finger and said separator finger operates to prevent advance toward said holding means of the nested coil springs until after removal from said holding means by said picker means of the previously leading coil spring.

12. A coil spring feeding machine in accordance with any of claims 9 or 10 wherein said separator finger includes a laterally inwardly located tip, a straight edge extending perpendicular to the path of coil spring advance and between said tip and said camming edge, a separating edge extending from said tip and in laterally outwardly and rearwardly inclined relation to the path of coil spring advance, and a stop edge extending from said separating edge in laterally outwardly and in perpendicular relation to the path of coil spring advance.

13. A coil spring feeding machine in accordance with any of claims 5, 9 and 10, and further including means on said frame for debunching the nested coil springs during travel toward said holding means.

14. A coil spring feeding machine in accordance with claim 13 wherein said coil spring debunching means comprises an inverted V-shaped member and means for engaging said member with the nested coil springs so as to partially separate the coil springs in the direction of the length of said first conveyor.

15. A coil spring feeding machine in accordance with claim 13 wherein said debunching means comprises a third conveyor having a run disposed in opposed relation to a run of said first conveyor for passage between said runs of the nested coil springs, said third conveyor run being driven in the same direction as said first conveyor run and at a rate of speed less than that of said first conveyor run.

16. A coil spring feeding machine comprising a frame, stationary means on said frame for releaseably holding individual coil springs delivered thereto, means on said frame for containing a plurality of serially nested coil springs and for advancing the coil springs along a path toward said coil spring holding means, conveyor means mounted on said frame for movement so as to transport coil springs from said holding means and including picker means engageable with a coil spring releaseably held by said holding means for removing the coil spring from said holding means in response to conveyor movement, and means located on said frame adjacent to said holding means and movable relative to the path of coil spring advance for delivering the leading coil spring into releaseable engagement with said holding means, while preventing advancement of the remainder of the nested coil springs toward said holding means, said means for delivering the leading coil spring while preventing advancement of the remainder of the nested coil springs including a stop finger movable between an advanced position and a retracted position and including an edge preventing coil spring advance when said stop finger is in the advanced position, said means for delivering the leading coil spring while preventing advancement of the remainder of the nested coil springs also including a separator finger including a coil spring camming edge extending in laterally outwardly and forwardly inclined relation to the path of coil spring advance for engaging and advancing the leading coil spring in response to laterally inward separator finger movement after withdrawal of said stop finger frame the advanced position.

17. A coil spring feeding machine comprising a frame, stationary means on said frame for releaseably holding individual coil springs delivered thereto, means on said frame for containing a plurality of serially nested coil springs and for advancing the coil springs along a path toward said coil spring holding means, conveyor means mounted on said frame for movement so as to transport coil springs from said holding means and including picker means engageable with a coil spring releaseably held by said holding means for removing the coil spring from said holding means in response to conveyor movement, and means located on said frame adjacent to said holding means and movable relative to the path of coil spring advance for delivering the leading coil spring into releaseable engagement with said holding means, while preventing advancement of the remainder of the nested coil springs toward said holding means, said means for delivering the leading coil spring while preventing advancement of the remainder of the nested coil springs including a stop finger and a separator finger, said separator finger including a coil spring camming edge extending in laterally outwardly and forwardly inclined relation to the path of coil spring advance for engaging and advancing the leading coil spring in response to laterally inward separator finger movement, a laterally inwardly located tip, a straight edge extending perpendicularly to the path of coil spring advance and between said tip and said camming edge, a separating edge extending from said tip and in laterally outwardly and rearwardly inclined relation to the path of coil spring advance, and a stop edge extending from said separating edge in laterally outwardly and in perpendicular relation to the path of coil spring advance.

* * * * *